(12) United States Patent
Boss et al.

(10) Patent No.: US 11,860,753 B1
(45) Date of Patent: Jan. 2, 2024

(54) MONITORING A DISTRIBUTED LEDGER NETWORK USING HIERARCHICAL VALIDATION WORKFLOWS

(71) Applicant: Optum, Inc., Minnetonka, MN (US)

(72) Inventors: Gregory J. Boss, Saginaw, MI (US); Adam Russell, Arlington, MA (US); Ramprasad Anandam Gaddam, Mumbai (IN); Robert Kahn Rossmiller, Brookfield, WI (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 18/079,639

(22) Filed: Dec. 12, 2022

(51) Int. Cl.
*G06F 11/30* (2006.01)
(52) U.S. Cl.
CPC ...... *G06F 11/3006* (2013.01); *G06F 11/3048* (2013.01)
(58) Field of Classification Search
None
See application file for complete search history.

(56) References Cited

U.S. PATENT DOCUMENTS

| | | | |
|---|---|---|---|
| 10,659,219 B1* | 5/2020 | Ganeshmani | H04L 9/0637 |
| 11,188,521 B2 | 11/2021 | Malfiza Garcia De Macedo et al. | |
| 2016/0117471 A1 | 4/2016 | Belt et al. | |
| 2017/0364655 A1 | 12/2017 | Farooqi | |
| 2018/0219685 A1 | 8/2018 | Deery et al. | |
| 2019/0189254 A1 | 6/2019 | Roennow | |
| 2019/0207766 A1* | 7/2019 | Sanghvi | H04L 63/123 |
| 2019/0318816 A1 | 10/2019 | Witchey | |
| 2020/0127812 A1* | 4/2020 | Schuler | H04L 9/3239 |
| 2021/0081271 A1* | 3/2021 | Doshi | G06F 11/0772 |
| 2022/0150073 A1 | 5/2022 | Androulaki et al. | |
| 2022/0303116 A1* | 9/2022 | Manuel-Devadoss | G06F 21/445 |

FOREIGN PATENT DOCUMENTS

WO 2022/016280 A1 1/2022

OTHER PUBLICATIONS

"Citizen Health—Optimal Health & Affordable Care for All," StartEngine, (41 pages), (Year: 2018), [Retrieved from the Internet Jul. 14, 2022] <URL: https://www.startengine.com/citizenhealth>.
Leeming, Gary et al. "A Ledger of Me: Personalizing Healthcare Using Blockchain Technology," Fronteirs in Medicine, vol. 6, No. 171, Jul. 24, 2019, DOI: 10.3389/fmed.2019.00171.
Peterson, Kevin J. et al. "A Blockchain-Based Approach to Health Information Exchange Networks," Computer Science, (10 pages), (Year: 2016), available online at: https://www.healthit.gov/sites/default/files/12-55-blockchain-based-approach-final.pdf.

* cited by examiner

*Primary Examiner* — Mohamed Ibrahim
(74) *Attorney, Agent, or Firm* — Alston & Bird LLP

(57) ABSTRACT

Various embodiments of the present disclosure provide methods, apparatus, systems, computing devices, computing entities, and/or the like for multi-node system monitoring using one or more distributed ledgers, wherein a ledger entry request received from a miner node computing entity is validated based at least in part on executing a hierarchical validation workflow that comprises an ordered sequence of L validation iterations, wherein each of one or more ith non-initial validation iterations is performed based at least in part on an association of an (i−1)th validation iteration with a non-affirmative validation determination.

20 Claims, 8 Drawing Sheets

| | 601 | 602 | 603 |
|---|---|---|---|
| | Example of Proof of Health Event Type | Required Validation Score Threshold | Steps |
| | Fitness Tracker Data (3rd party, e.g., Peloton, Apple Watch, geolocation) | Low (e.g. 0.6 in [0, 1]) | Daily digest sent to chain from device. Fraud detection for secondary validation (common location, activity-level outlier) |
| | Medical Device Data (e.g., at home medical device) | Medium (e.g. 0.8 in [0, 1]) | Daily digest sent to chain from device, clinical records agree |
| | Dr's office visit | High (e.g. 0.9 in [0, 1]) | Visit recorded in multiple places (UHG claim, Dr's calendar, clinical records) |
| | Lab Test Results | Highest (e.g. 0.95 in [0, 1]) | Did the test happen? Do the results agree? |

FIG. 6

| 701 | 702 |
| --- | --- |
| Validation Effect Measure Criteria | Exemplary Effect on Validation Effect Score Measure |
| Public API | + 0.1 |
| Existing Data (Amount of Data Current Stored) | + 0.1 x (Data amount in Terabytes) |
| Percent Coverage of Population | + (0.5 x Percentage of Population) |

MONITORING A DISTRIBUTED LEDGER NETWORK USING HIERARCHICAL VALIDATION WORKFLOWS

BACKGROUND

Various embodiments of the present disclosure address technical challenges related to performing network-wide monitoring in a multi-node system and disclose techniques for efficiently and effectively performing network-wide monitoring in a multi-node system.

BRIEF SUMMARY

In general, various embodiments of the present disclosure provide methods, apparatus, systems, computing devices, computing entities, and/or the like for network-wide monitoring in a multi-node system using a hierarchical validation workflow.

In accordance with one aspect, a method is provided. In one embodiment, the method comprises: receiving, by one or more processors, a ledger entry request originating from a miner node computing entity associated with a miner node of a plurality of nodes, wherein (a) the ledger entry request is a request to commit a candidate event to a distributed ledger, and (b) the candidate event is associated with an event type of a plurality of event types; generating, by the one or more processors, a validation score wherein (a) the validation score comprises a baseline score, and (b) the baseline score is generated based at least in part on a miner effect measure associated with the miner node for the event type; and executing, by the one or more processors, a hierarchical validation workflow, wherein: (i) the hierarchical validation workflow comprises an ordered sequence of L validation iterations, (ii) each of one or more ith non-initial validation iterations is performed based at least in part on an association of an (i−1)th validation iteration with a non-affirmative validation determination, and (iii) each validation iteration comprises: receiving, originating from a validator node computing entity associated with a validator node of the plurality of nodes, a validation request to validate the candidate event, incrementally updating the validation score based at least in part on monitoring data associated with the validation request that matches attributes of the candidate event, and in response to the updated validation score satisfying a consensus threshold for the candidate event, (i) generating an affirmative validation determination, and (ii) initiating execution of a write command to add the candidate event to the distributed ledger.

In accordance with another aspect, an apparatus comprising at least one processor and at least one memory including computer program code is provided. In one embodiment, the at least one memory and the computer program code may be configured to, with the processor, cause the apparatus to: receive a ledger entry request originating from a miner node computing entity associated with a miner node of a plurality of nodes, wherein (a) the ledger entry request is a request to commit a candidate event to a distributed ledger, and (b) the candidate event is associated with an event type of a plurality of event types; generate a validation score, wherein (a) the validation score comprises a baseline score, and (b) the baseline score is generated based at least in part on a miner effect measure associated with the miner node for the event type; and execute a hierarchical validation workflow, wherein: (i) the hierarchical validation workflow comprises an ordered sequence of L validation iterations, (ii) each of one or more ith non-initial validation iterations is performed based at least in part on an association of an (i−1)th validation iteration with a non-affirmative validation determination, and (iii) each validation iteration comprises: receiving, originating from a validator node computing entity associated with a validator node of the plurality of nodes, a validation request to validate the candidate event, incrementally updating the validation score based at least in part on monitoring data associated with the validation request that matches attributes of the candidate event, and in response to the updated validation score satisfying a consensus threshold for the candidate event, (i) generating an affirmative validation determination, and (ii) initiate execution of a write command to add the candidate event to the distributed ledger.

In accordance with yet another aspect, a computer program product is provided. The computer program product may comprise at least one computer-readable storage medium having computer-readable program code portions stored therein, the computer-readable program code portions comprising executable portions configured to: receive a ledger entry request originating from a miner node computing entity associated with a miner node of a plurality of nodes, wherein (a) the ledger entry request is a request to commit a candidate event to a distributed ledger, and (b) the candidate event is associated with an event type of a plurality of event types; generate a validation score, wherein (a) the validation score comprises a baseline score, and (b) the baseline score is generated based at least in part on a miner effect measure associated with the miner node for the event type; and execute a hierarchical validation workflow, wherein: (i) the hierarchical validation workflow comprises an ordered sequence of L validation iterations, (ii) each of one or more ith non-initial validation iterations is performed based at least in part on an association of an (i−1)th validation iteration with a non-affirmative validation determination, and (iii) each validation iteration comprises: receiving, originating from a validator node computing entity associated with a validator node of the plurality of nodes, a validation request to validate the candidate event, incrementally updating the validation score based at least in part on monitoring data associated with the validation request that matches attributes of the candidate event, and in response to the updated validation score satisfying a consensus threshold for the candidate event, (i) generating an affirmative validation determination, and (ii) initiate execution of a write command to add the candidate event to the distributed ledger.

BRIEF DESCRIPTION OF THE DRAWINGS

Figure 1:
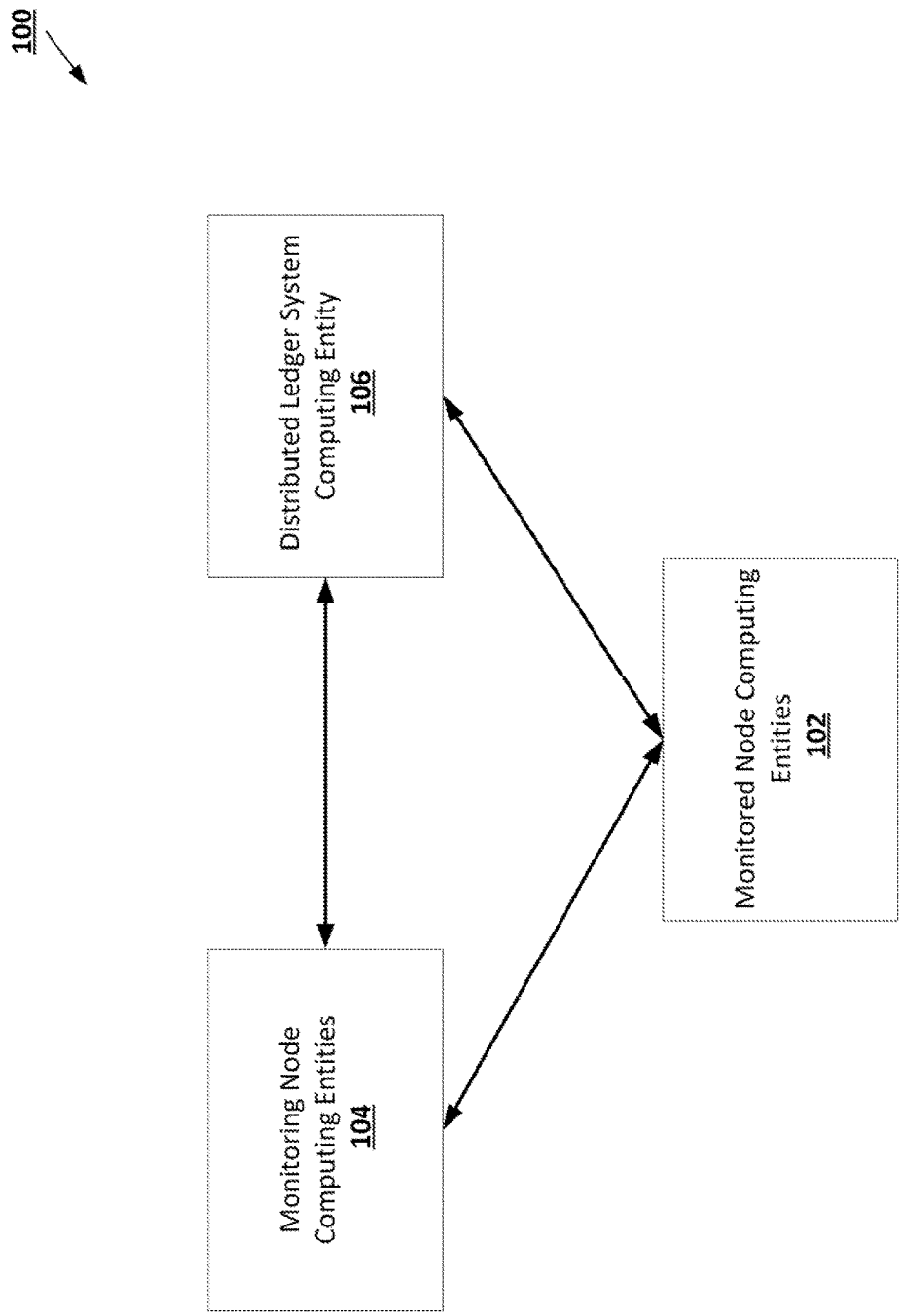

Having thus described the disclosure in general terms, reference will now be made to the accompanying drawings, which are not necessarily drawn to scale, and wherein:

FIG. 1 provides an exemplary overview of an architecture that can be used to practice embodiments of the present disclosure.

Figure 2:
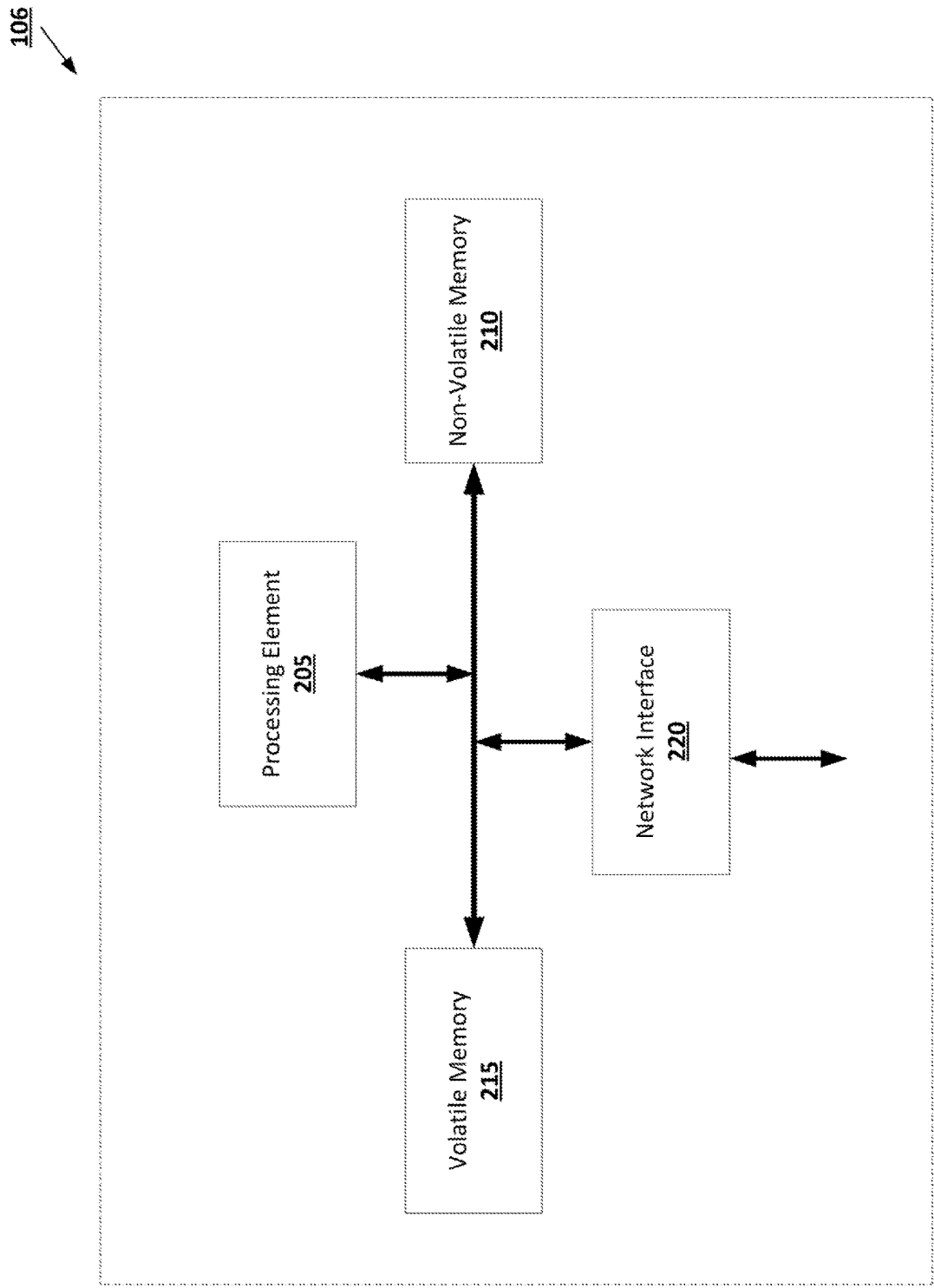

FIG. 2 provides an example distributed ledger system computing entity in accordance with some embodiments discussed herein.

Figure 3:
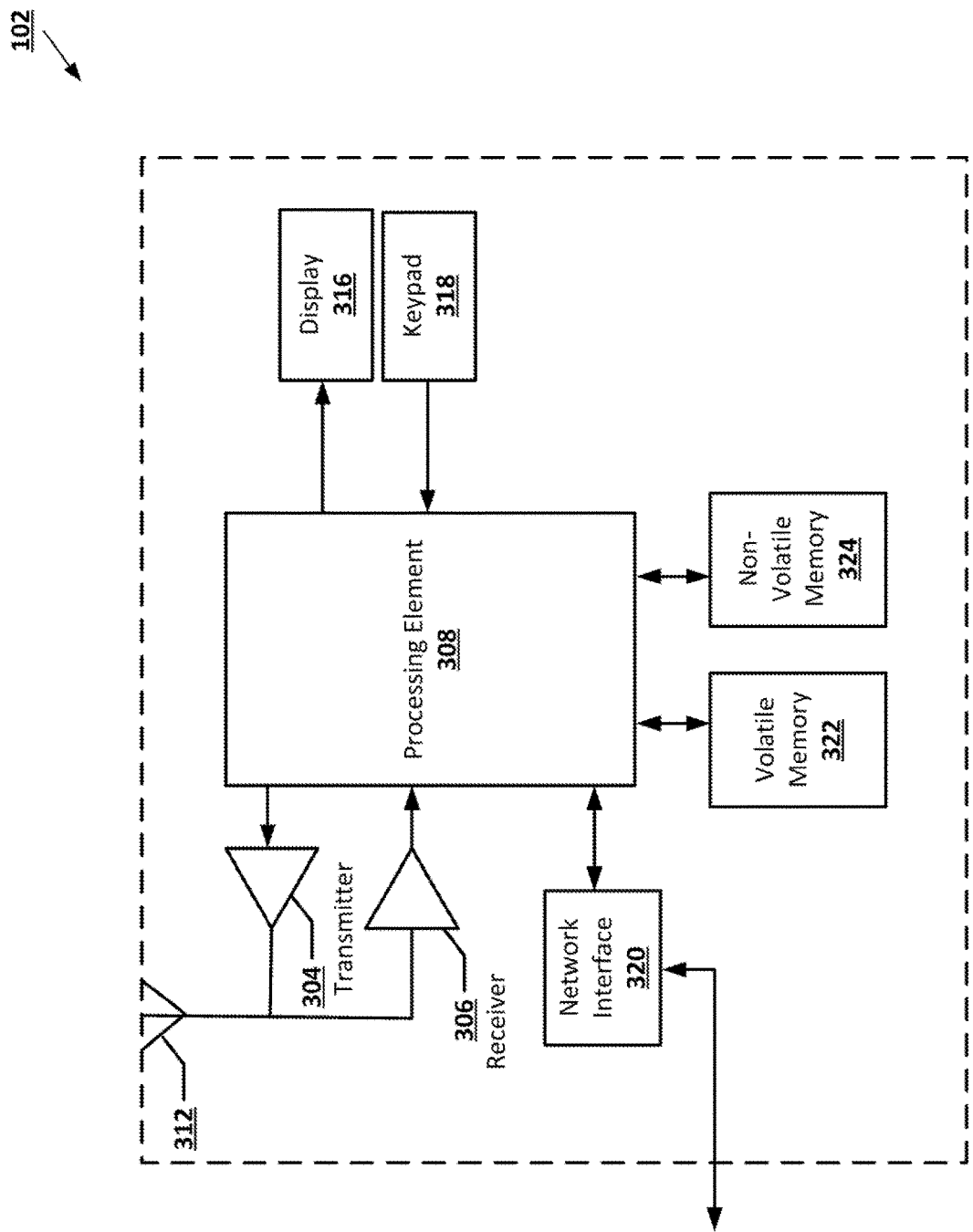

FIG. 3 provides an example monitored node computing entity in accordance with some embodiments discussed herein.

Figure 4:
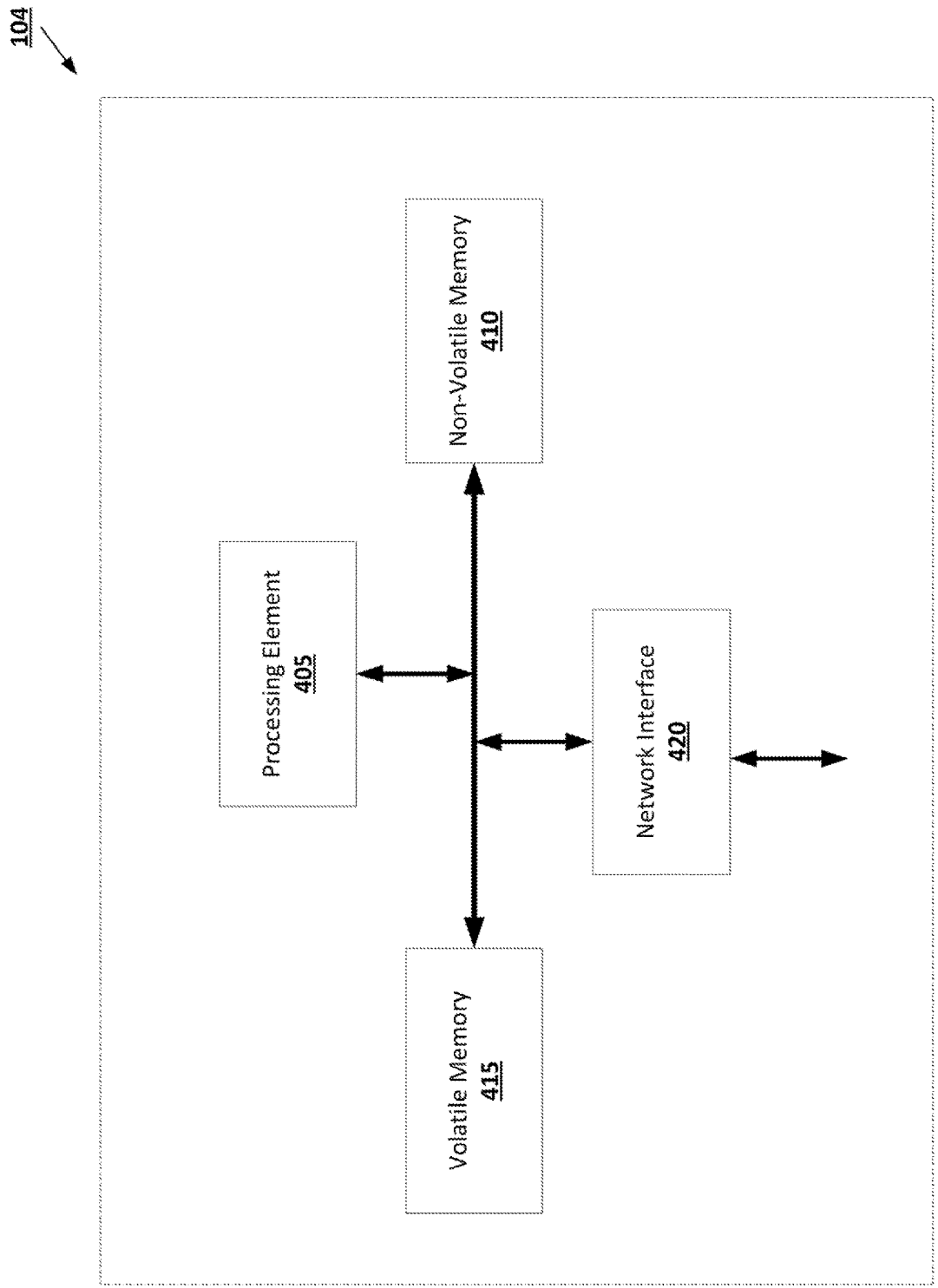

FIG. 4 provides an example monitoring node computing entity in accordance with some embodiments discussed herein.

Figure 5:
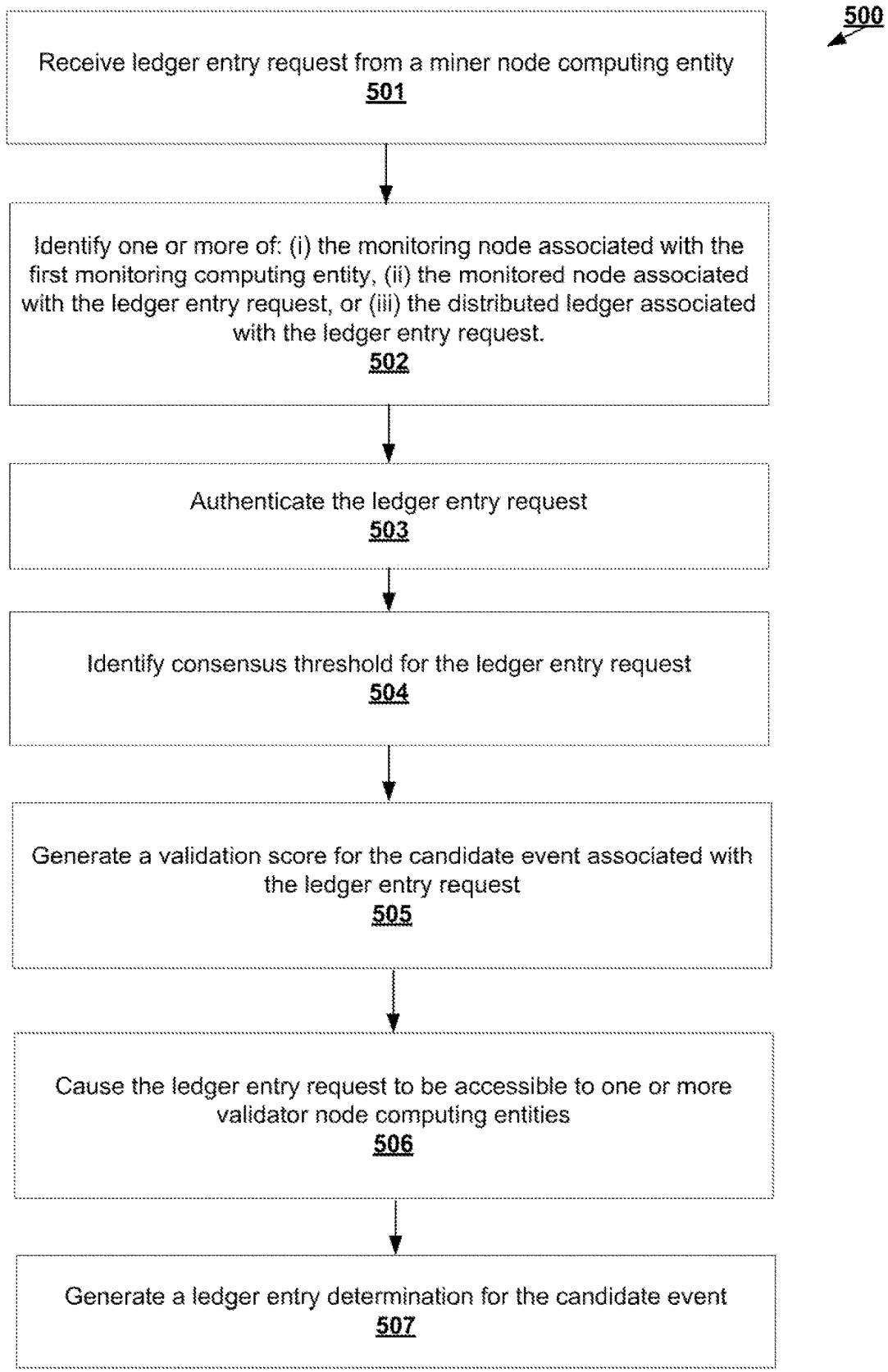

FIG. 5 is a flowchart diagram of an example process for performing ledger-based monitoring of a multi-node system using a hierarchical validation workflow in accordance with some embodiments discussed herein.

FIG. 6 provides an operational example of event types in accordance with some embodiments discussed herein.

FIG. 7 provides an operational example of validator effect measure criteria in accordance with some embodiments discussed herein.

Figure 8:
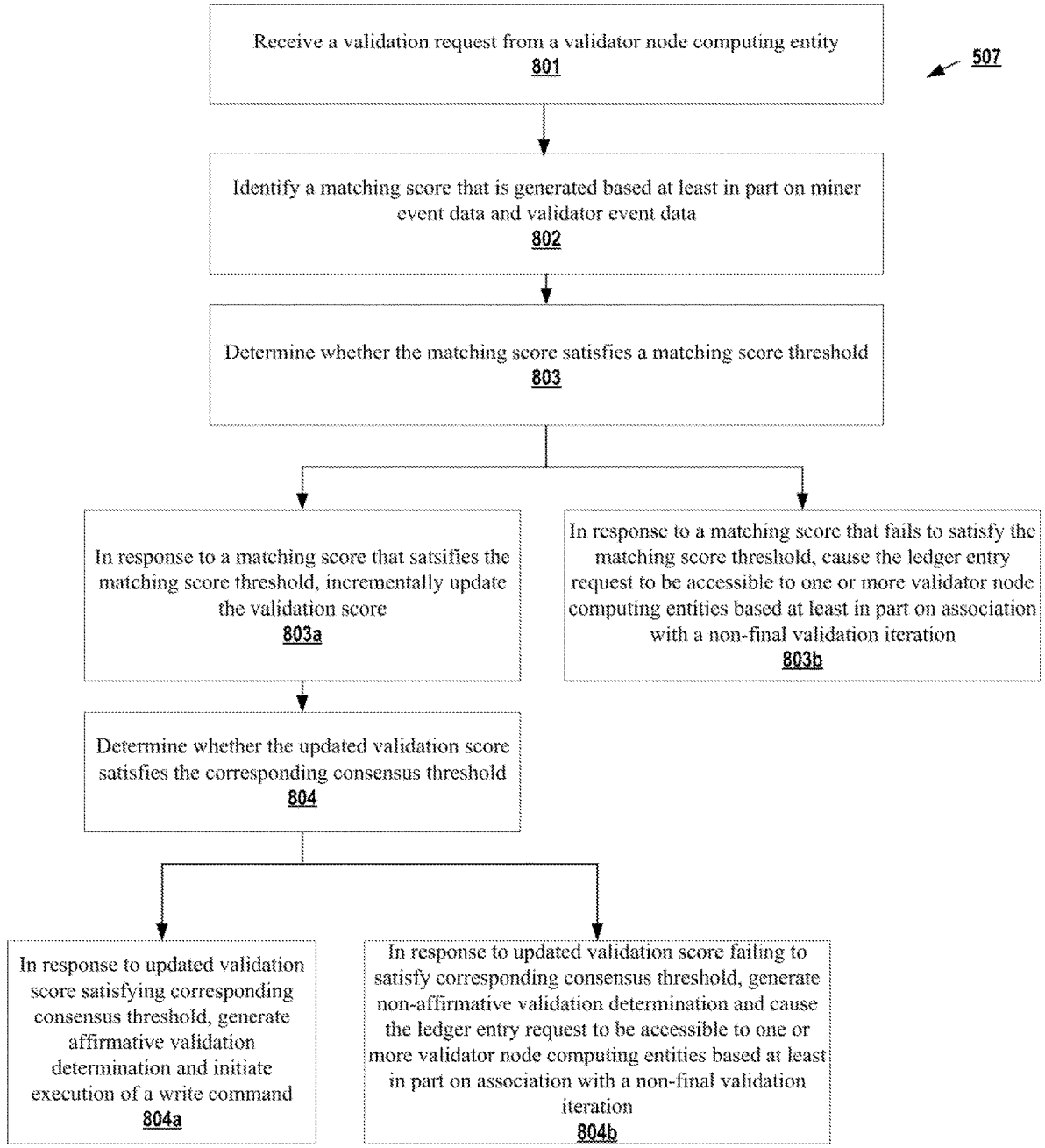

FIG. 8 provides a flowchart diagram of an example process for executing a validation iteration in accordance with some embodiments discussed herein.

DETAILED DESCRIPTION

Various embodiments of the present disclosure now will be described more fully hereinafter with reference to the accompanying drawings, in which some, but not all, embodiments of the disclosures are shown. Indeed, these disclosures may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to predictive data analysis, one of ordinary skill in the art will recognize that the disclosed concepts can be used to perform other types of data analysis.

I. Overview and Technical Improvements

Various embodiments of the present disclosure introduce techniques for efficient and scalable monitoring of a multi-node system by using a distributed ledger to describe candidate events associated with a monitored node and a hierarchical validation workflow to validate candidate events (e.g., obtain consensus) associated with ledger entry requests. Using a distributed ledger to describe candidate events associated with a monitored node provides a scalable and efficient way to store candidate event data associated with the monitored node. In some embodiments, one or more monitoring node computing entities (e.g., miner node computing entities and validator node computing entities) can execute operations associated with a ledger entry request to add a candidate event to a distributed ledger that is done in a distributed manner. This means that the distributed ledger system computing entity can maintain the distributed ledger without the need to request data from the monitored node computing entities, the miner node computing entities, or the validator node computing entities, as in turn the miner node computing entities initiate ledger entries into distributed ledgers upon detecting candidate events associated with a monitored node that is associated with the multi-node system (e.g., distributed ledger system), and in turn, the one or more validator nodes can initiate a validation request to validate the candidate events.

In some embodiments, using a distributed ledger to maintain candidate events associated with a monitored node and using a hierarchical validation workflow that is based at least in part on a validator effect measure associated with the validator nodes lead to more efficient use of computational and network resources because it requires fewer number of network transmissions between the distributed ledger system computing entity and monitoring node computing entities (e.g., miner node computing entities and validator node computing entities). In some embodiments, without using the ledger-based techniques described herein, establishing occurrence of candidate events associated with a particular monitored node would require significant network transmissions in multiple request network transmissions and multiple response network transmissions, where each request network transmission is from a central computing entity to a respective monitored node computing entity to inquire about the occurrence and/or details of candidate events associated with the particular monitored node, and where each response network transmission is a response by a monitored node computing entity to a request network transmission that is received by the central computing entity and describes data regarding occurrence and/or details of candidate events associated with the particular monitored node. In contrast, using various ledger-based techniques described herein eliminates the need for the noted request network transmissions and response network transmission to establish the occurrence of a candidate event of the particular monitored node and would require less network transmission, where each network transmission is a ledger entry request for a candidate event associated with a monitored node that is transmitted by a miner node computing entity to a central computing entity, such as the distributed ledger system computing entity or a validation request to validate a candidate event that is transmitted by a validator node computing entity to the central computing entity. Which means that, by using the various ledger-based techniques described herein, the number of network transmissions needed to determine/maintain data about candidate events associated with a monitored node is decreased, which in turn means using the noted ledger-based techniques leads to more efficient computational/networking resources. Moreover, using the hierarchical validation workflow techniques described herein reduces computational complexity associated with performing effective monitoring using a set of operations that have less computational complexity.

II. Definitions

A "distributed ledger" may refer to a data construct that describes a digital ledger that comprise a growing list of data object in form of records or blocks, that may be used to record events across multiple computing entities. According to various embodiments of the present disclosure, a distributed ledger may be a blockchain that comprises a growing list of blocks that may be linked together based at least in part on cryptography. Each block, for example, may include a cryptographic hash of the previous block, a timestamp, and event data. In some embodiments, a distributed ledger may be maintained by a distributed ledger system computing entity that is associated with miner node computing entities and validator node computing entities associated with a plurality of nodes adhering to a consensus protocol for committing candidate events associated with monitored nodes to a distributed ledger. In some embodiments, an example distributed ledger may be configured to maintain/store candidate events. In some embodiments, a candidate event maintained/stored in an example distributed ledger may represent a block in a blockchain and may establish proof of occurrence of the candidate event.

The term "distributed ledger system" may refer to a data construct that describes, for a monitored node associated with the distributed ledger system, one or more events associated with the monitored node that is committed to a distributed ledger maintained by a distributed ledger system computing entity associated with the distributed ledger system. In some embodiments, the one or more events may include one or more candidate events associated with a monitored node, where each committed candidate event (e.g., candidate event added to a distributed ledger) may be indicative of proof of occurrence of the candidate event. As an example, in some operational implementations, where candidate events may comprise health-related events, each committed candidate event to a distributed ledger associated with a monitored node may be indicative of proof of occurrence of the candidate event, and individually or collectively indicative of proof of health with respect to the entity associated with the monitored node. As another example, in some operational implementations, where candidate events may comprise E-commerce-related events, each committed candidate event to a distributed ledger associated with a monitored node may be indicative of proof of occurrence of the candidate event, and individually or collectively indicative of proof of occurrence of Business-to-Business (B2B) transaction, Business-to-Customer (B2C) transaction, Customer-to-Business (C2B) transaction, Customer-to-Customer (C2C) transaction, and/or the like. A distributed ledger system may comprise a plurality of nodes that includes one or more miner nodes and one or more validator nodes adhering to a consensus protocol for committing candidate events associated with monitored nodes to corresponding distributed ledgers. In some embodiments, the plurality of nodes comprises at least some nodes being miner nodes and validator nodes. In some embodiments, the distributed ledger system computing entity 106 may maintain a distributed ledger associated with a plurality of monitored nodes. In some embodiments, the distributed ledger system computing entity 106 may maintain a plurality of distributed ledgers, where each distributed ledger is associated with a monitored node of a plurality of monitored nodes.

The term "monitored node" may refer to a data construct that describes a digital identifier associated with a computing entity (e.g., also referred to herein as monitored node computing entity) representative of a real-world entity or virtual entity whose candidate events may be committed to a distributed ledger that is maintained by a distributed ledger system computing entity. An example of a monitored node is a digital identifier associated with a computing entity representative of an individual, a group of individuals, an organization, a device, and/or the like. In an operational example, each monitored node may comprise a digital identifier associated with a computing entity representative of a health insurance member of a health insurance provider (e.g., an individual enrolled in a health insurance plan that is offered by the health insurance provider), where for each digital identifier, each candidate event committed to a distributed ledger may represent proof of occurrence of a health event with respect to the health insurance member, and individually or collectively represent proof of health for the health insurance member. A monitored node may be monitored by one or more miner nodes and/or validator nodes. In some embodiments, a monitored node may be monitored by a miner node and/or validator node in that a miner node and/or validator node (via associated computing entity) may collect data associated with (or otherwise that describes) candidate events. Accordingly, a monitored node may also describe a digital identifier associated with a computing entity representative of a real-world entity and/or virtual entity, where the monitored node is associated with one or more miner nodes and/or validator nodes that can collect (and/or otherwise access), via one or more computing entities associated with the monitored node, data associated with (or otherwise that describes) candidate events associated with the monitored node. A monitored node, for example, may be associated with one or more computing entities that may in turn be associated with a miner node and/or validator node, wherein the miner node and/or validator node can collect data associated with the monitored node based at least in part on the one or more computing entities associated with the monitored node and the miner node and/or validator node. The one or more computing entities, for example, may include a smart phone, a smart watch, a smart refrigerator, Internet of Things device, a smart home device, a global positioning system (GPS) device and/or the like. A monitored node, for example, may be associated with one or more computing entities that may enable a miner node and/or validator node to collect candidate event data associated with the monitored node via one or more software applications, software programs and/or the like installed therein, where the noted one or more software applications, software programs and/or the like may be associated with the monitoring entity (e.g., an entity associated with a miner node or a validator node, for example, may comprise a software provider of the noted software application, software program, and/or the like, and/or a provider of the computing entity itself.).

The term "miner node" may refer to a data construct that describes a digital identifier associated with a computing entity representative (also referred to herein as miner node computing entity) of a real-world entity and/or a virtual entity that can initiate/propose a ledger entry for a candidate event associated with a monitored node. A miner node may be associated with one or more monitored nodes in that the miner node can collect, via one or more computing entities, associated with the miner node, miner event data for candidate events associated with the one or more monitored nodes. In some embodiments, when a miner node computing entity can initiate a ledger entry, a successful ledger entry request by the miner node computing entity may cause a distributed ledger system computing entity to generate a validation score that comprises a baseline score, where, for example, the baseline score may be generated based at least in part on a miner effect measure for the miner node.

The term "validator node" may refer to a data construct that describes a digital identifier associated with a computing entity representative (also referred to herein as validator node computing entity) of a real-world entity and/or a virtual entity that can contribute to validation (e.g., endorsement) of a candidate event associated with a monitored node, in order to commit the candidate event to a distributed ledger maintained by a distributed ledger system computing entity. A validator node may be associated with one or more monitored nodes in that the validator node can collect, via one or more computing entities, associated with the validator node, validator event data for candidate events associated with the one or more monitored nodes. In some embodiments, when a validator node computing entity can contribute to a validation score for a candidate event, a distributed ledger system computing entity can apply a validator effect measure associated with the validator node computing entity to the validation score generated for the candidate event. In some embodiments, applying a validator effect measure to a validation score for a candidate event comprise increasing the validation score for the candidate event based at least in part on the validator effect measure, where the validator effect measure, for example, may comprise and/or may be translated to a numerical value/score.

The term "miner event data" may refer to data (e.g., that may include metadata) that describes attributes of a candidate event that is proposed by a miner node to commit to a distributed ledger. Miner event data, for example, may comprise data collected by the miner node during occurrence of an event (e.g., candidate event) associated with a monitored node, such as data collected during a physical activity event that describes attributes of the event.

The term "validator event data" may refer to a data (e.g., that may include metadata) that describes attributes of a candidate event that is used by a validator node in a validation iteration to validate the candidate event. Validator event data, for example, may describes attributes of a candidate event presented by a validator node (e.g., via associated computing entity) as representative of a candidate event, and that can be used in a validation iteration for validating the candidate event.

The term "validator effect measure" may refer to a data construct that describes an estimated measure, such as a score, assigned to a validator node, that can be applied to a validation score for a candidate event. For example, a validation score associated with a candidate event may be updated based at least in part on a validator effect measure of a validator node associated with a validation iteration that satisfies one or more criteria. In some embodiments, a validator node may be associated with a validator effect measure for each event type of a plurality of event types. In some embodiments, a validator effect measure for a given validator node may be indicative of a trust level and/or confidence level associated with the validator node based at least in part on one more validation effect measure criteria.

The term "miner effect measure" may refer to a data construct that describes an estimated measure, such as a score, assigned to a miner node, that may be used by a distributed ledger system to initialize a validation score for a candidate event. For example, in some embodiments, a distributed ledger system may generate a validation score for a candidate event based at least in part a baseline score, where the baseline score may be generated based at least in part on the miner effect measure associated with the miner node for the ledger entry request. In some embodiments, a miner node may be associated with a miner effect measure for each event type of a plurality of event types. In some embodiments, where a node may represent a miner node and a validator node, a miner effect measure for a miner node may comprise a validator effect measure for the miner node.

The term "validation score" may refer to a data construct that describes a score assigned to a candidate event proposed (e.g., by a miner node computing entity associated with a miner node), to be added to a distributed ledger, and that is used by a distributed ledger system to determine if the candidate event should be added to the distributed ledger based at least in part on comparing the validation score with a consensus threshold. In various embodiments, in response to a ledger entry request for a candidate event, a validator score is generated (e.g., initialized) for the candidate event, where the validator score comprises a baseline that may be incrementally updated based at least in part on applying a validator effect measure of one or more validator nodes that satisfy one or more criteria (e.g., having monitoring data that matches attributes of the candidate event).

The term "consensus threshold" may refer to a data construct that describes criteria, such as a predetermined score, that may be used by a distributed ledger system to determine if a proposed candidate event should be committed to a distributed ledger associated with the distributed ledger system. A distributed ledger system may compare output (e.g., updated validation score) of each validation iteration of a hierarchical validation workflow to determine if a candidate event (e.g., described by miner event data) should be committed to (e.g., added to) a distributed ledger.

The term "candidate event" may refer to a data construct that describes an event (e.g., activity, incident, interaction, and/or the like) having a designation, such as an event type designation that is within an event type space associated with a distributed ledger system, where an event type space associated with a distributed ledger system may comprise a plurality of event types, and may indicate events that may be committed to a distributed ledger associated with the distributed ledger system. In some embodiments, an event type space may be associated with a category of events. For example, a distributed ledger system may be associated with an event type space, where each event type within the event type space comprises a health-related event type (e.g., physical activity event type, medical visit event type, laboratory visit event type, and/or the like). In the noted example, each candidate event committed to a distributed ledger may be used to establish proof of health for the associated monitored node. As another example, a distributed ledger system may be associated with an event type space, where each event type within the event type space comprises an E-commerce-related event type (e.g., a purchase event type, a supply event type, a delivery event type, and/or the like). In the noted example, each candidate event committed to a distributed ledger may be used to establish proof of transaction. In some embodiments, each event type of a plurality of event types may be associated with a consensus threshold. In some embodiments, various event types may be associated with different consensus threshold. For example, in some embodiments, a candidate event may be recorded in a distributed ledger based at least in part on associated validation score satisfying (e.g., exceeding) a consensus threshold for the event type of the candidate event.

The term "ledger entry request" may refer to a data construct that describes a request that is transmitted, to a distributed ledger system computing entity, by a miner node computing entity associated with a miner node, where the request may comprise a request to commit a candidate event to a distributed ledger associated with a monitored node. In some embodiments, a ledger entry request comprises one or more identifying fields associated with the corresponding monitored node associated with the ledger entry request. For example, where the monitored node is associated with a computing entity representative of an individual, the ledger entry request may include identifying data (e.g., digital identifier) configured to uniquely identify the individual. Additionally, and/or alternatively, in some embodiments, the ledger entry request may include identifying data (e.g., digital identifier) configured to uniquely identify the miner node. Additionally, and/or alternatively, in some embodiments, the ledger entry request may include authentication data (e.g., a password, a passcode, a pin number, and/or the like) that is configured to, if verified, demonstrate that the miner node is authorized to commit candidate events to a distributed ledger associated with the monitored node. In some embodiments, each ledger entry request may be broadcast (e.g., made accessible) to one or more other miner nodes and/or validator nodes via one or more validation queues (e.g., a primary validation queue, a secondary validation queue, a tertiary validation queue, and or the like).

The term "hierarchical validation workflow" may refer to a process comprising an ordered sequence of validation iterations that may be executed in order to determine if a proposed candidate event should be recorded in a distributed ledger maintained by a distributed ledger system computing entity. In some embodiments, a hierarchical validation workflow may be executed in response to a ledger entry request by a miner node computing entity associated with a miner node. For example, a hierarchical validation workflow may be triggered in response to a validation request, wherein the validation request is triggered based at least in part in response to the ledger entry request. In some embodiments, a hierarchical validation workflow may comprise an ordered sequence of L validation iterations, where each of one or more ith non-initial validation iterations is performed based at least in part on an association of an (i−1)th validation iteration with a non-affirmative validation determination. For example, consider where a first validation iteration is associated with a non-affirmative validation determination output, a second validation iteration may be performed based at least in part on association of the first validation iteration with a non-affirmative validation determination output for the first validation iteration, a third validation iteration may be performed based at least in part on association of the second validation iteration with a non-affirmative validation determination output for the second validation iteration, a forth validation iteration may be performed based at least in part on association of the third validation iteration with a non-affirmative validation determination output for the third validation iteration, and a fifth validation iteration may not be performed based at least in part on association of the fourth validation iteration with an affirmative validation determination output for the fourth validation iteration. As another example, consider where a first validation iteration is associated with a non-affirmative validation determination output, a second validation iteration may be performed based at least in part on association of the first validation iteration with a non-affirmative validation determination output for the first validation iteration, a third validation iteration may be performed based at least in part on association of the second validation iteration with a non-affirmative validation determination output for the second validation iteration, and a fourth validation iteration may not be performed based at least in part on association of the third validation iteration with an affirmative validation determination output. In some embodiments, each validation iteration may be associated with a unique validator node.

The term "validation iteration" may refer to a validation operation (e.g., computer executed operation) that may be performed in response to a ledger entry request to commit a candidate event to a distributed ledger for a monitored node associated with a distributed ledger system. In some embodiments, a validation iteration is configured to incrementally update a validation score for a candidate event based at least in part on miner event data reported by a miner node computing entity and validator event data reported by a validator node, and that may be used by a distributed ledger system computing entity to determine a ledger entry determination for the candidate event. In some embodiments, a validation iteration, for example, may include comparing miner event data with validator event data to generate a matching score, that may in turn be used to determine if a validator effect measure associated with the validator node should be applied. A validation iteration, for example, may include determining if the validator node is associated with monitoring data (e.g., miner event data) indicative of the occurrence of the candidate event, and in response to determining that the validator node is associated with such data, comparing the monitoring data (e.g., validator event data) with the miner event data to determine if the miner event data and validator event data match. In some embodiments, the validation score for a candidate event can be incrementally updated (e.g., increased) based at least in part on a validator effect measure associated with the validator node if it is determined that the validator event data matches the miner event data. Examples of attributes of a candidate event may include an environmental attribute, such as a location attribute (e.g., location of occurrence of the candidate event), temporal data (e.g., date and/or time of occurrence of the candidate event), duration of the candidate event, and/or the like.

The term "non-affirmative validation determination" may refer to a data construct that describes output of a validation iteration performed with respect to a candidate event, and that indicates a validation score that fails to satisfy the consensus threshold for the candidate event.

The term "affirmative validation determination" may refer to a data construct that describes output of a validation iteration performed with respect to a candidate event, and that indicates a validation score for the candidate event that satisfies the consensus threshold for the candidate event.

The term "ledger entry determination" may refer to a data construct that describes a result of a ledger entry request based at least in part on a validation score for the candidate event associated with the ledger entry request. In some embodiments, an affirmative ledger entry determination may describe a ledger entry request for a candidate event associated with a validation score that satisfies the consensus threshold for the candidate event, and a non-affirmative ledger entry determination may describe a ledger entry request for a candidate event associated with a validation score that fails to satisfy a consensus threshold for the candidate event. In some embodiments, in response to an affirmative ledger entry determination, a distributed ledger system computing entity may initiate execution of a write command to commit the miner event data for the candidate event to a corresponding distributed ledger.

III. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example architecture 100 for a distributed ledger system. As shown in FIG. 1, the distributed ledger system 100 comprises a plurality of monitored node computing entities 102, a plurality of monitoring node computing entities 104 (each monitoring node computing entity 104 may represent a miner node computing entity and/or a validator node computing entity), and a distributed ledger system computing entity 106. The distributed ledger system computing entity 106 may be configured to communicate with the plurality of monitoring node computing entities 104. In some embodiments, the distributed ledger system computing entity 106 can communicate with the plurality of monitored node computing entities 102.

As further described below, a miner node may describe a digital identifier associated with a computing entity (e.g., miner node computing entity) representative of a real-world entity and/or a virtual entity that can initiate (e.g., propose) data entry of a candidate event associated with a monitored node in a distributed ledger maintained by the distributed ledger system computing entity 106. As further described below, a validator node may describe a digital identifier associated with a computing entity (e.g., validator node computing entity) representative of a real-world entity and/or a virtual entity that can contribute to validation (e.g., confirmation, endorsement, and/or the like) of initiated/proposed data entry of a candidate event in a distributed ledger maintained by the distributed ledger system computing entity 106. As further described below, a monitored node may describe a digital identifier associated with a computing entity (e.g., monitoring node computing entity) representative of a real-world entity or virtual entity whose candidate events may be committed to a distributed ledger that is maintained by the distributed ledger system computing entity 106.

The distributed ledger system computing entity 106 may be configured to, for a monitored node, maintain in a distributed ledger associated with the monitored node, one or more candidate events associated with the monitored node that satisfies corresponding consensus thresholds for the respective candidate events. The distributed ledger system computing entity 106 may be associated with one or more validation queues (e.g., a primary validation queue, a secondary validation queue, a tertiary validation queue, and/or the like) and may be configured to enable access to one or more validator nodes in order to execute a validation iteration. In some embodiments, the distributed ledger system computing entity 106 may maintain in a repository, system data associated with the distributed ledger system computing entity 106. In some embodiments, the system data may include: data that describes a plurality of event types; data that describes, for each event type, a consensus threshold; data that describes, for each miner node and validator node, a corresponding miner effect measure and/or validator effect measure; data that describes, for each miner node and validator node, permissions associated with the miner node and validator node, that is representative of types of access within the distributed ledger system that a respective miner node and respective validator node is associated with; data that describes, for a monitored node, permissions associated with the monitored node, that is representative of types of access within the distributed ledger system that a respective monitored node is associated with. For example, a given miner node and/or validator node may be associated with a particular level of access with respect to a given distributed ledger, whereby the miner node and/or validator node may be granted access to certain data but may not be granted access to some data.

A. Exemplary Distributed Ledger System Computing Entity

FIG. 2 provides a schematic of a distributed ledger system computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the distributed ledger system computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the distributed ledger system computing entity 106 may include, or be in communication with, one or more processing elements 205 (also referred to as processors, processing circuitry, and/or similar terms used herein interchangeably) that communicate with other elements within the distributed ledger system computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application-specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the distributed ledger system computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the distributed ledger system computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the distributed ledger system computing entity 106 with the assistance of the processing element 205 and operating system.

As indicated, in one embodiment, the distributed ledger system computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the distributed ledger system computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the distributed ledger system computing entity 106 may include, or be in communication with, one or more input elements, such as a keyboard input, a mouse input, a touch screen/display input, motion input, movement input, audio input, pointing device input, joystick input, keypad input, and/or the like. The distributed ledger system computing entity 106 may also include, or be in communication with, one or more output elements (not shown), such as audio output, video output, screen/display output, motion output, movement output, and/or the like.

B. Exemplary Monitored Node Computing Entity

FIG. 3 provides an illustrative schematic representative of a monitored node computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Monitored node computing entities 102 can be operated by various parties. As shown in FIG. 3, the monitored node computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the monitored node computing entity 102 may be capable of operating with one or more air interface standards, communication protocols, modulation types, and access types. More particularly, the monitored node computing entity 102 may operate in accordance with any of a number of wireless communication standards and protocols, such as those described above with regard to the distributed ledger system computing entity 106. In a particular embodiment, the monitored node computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the monitored node computing entity 102 may operate in accordance with multiple wired communication standards and protocols, such as those described above with regard to the distributed ledger system computing entity 106 via a network interface 320.

Via these communication standards and protocols, the monitored node computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The monitored node computing entity 102 can also download changes, add-ons, and updates, for instance, to its firmware, software (e.g., including executable instructions, applications, program modules), and operating system.

According to one embodiment, the monitored node computing entity 102 may include location determining aspects, devices, modules, functionalities, and/or similar words used herein interchangeably. For example, the monitored node computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the monitored node computing entity's 102 position in connection with a variety of other systems, including cellular towers, Wi-Fi access points, and/or the like. Similarly, the monitored node computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The monitored node computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the monitored node computing entity 102 to interact with and/or cause display of information/data from the distributed ledger system computing entity 106, as described herein. The user input interface can comprise any of a number of devices or interfaces allowing the monitored node computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the monitored node computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The monitored node computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the monitored node computing entity 102. As indicated, this may include a user application that is resident on the entity or accessible through a browser or other user interface for communicating with the distributed ledger system computing entity 106 and/or various other computing entities.

In another embodiment, the monitored node computing entity 102 may include one or more components or functionality that are the same or similar to those of the distributed ledger system computing entity 106, as described in greater detail above. As will be recognized, these architectures and descriptions are provided for exemplary purposes only and are not limiting to the various embodiments.

In various embodiments, the monitored node computing entity 102 may be embodied as an artificial intelligence (AI) computing entity, such as an Amazon Echo, Amazon Echo Dot, Amazon Show, Google Home, and/or the like. Accordingly, the monitored node computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

C. Exemplary Monitoring Node Computing Entity

FIG. 4 provides a schematic of a monitoring node computing entity 104 according to one embodiment of the present disclosure. As previously noted, each monitoring node computing entity 104 may represent a miner node computing entity and/or a validator node computing entity. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the monitoring node computing entity 104 may also include one or more communications interfaces 420 for communicating with various computing entities, such as by communicating data, content, information, and/or similar terms used herein interchangeably that can be transmitted, received, operated on, processed, displayed, stored, and/or the like.

As shown in FIG. 4, in one embodiment, the monitoring node computing entity 104 may include, or be in communication with, one or more processing elements 405 (also referred to as processors, processing circuitry, and/or similar terms used herein interchangeably) that communicate with other elements within the monitoring node computing entity 104 via a bus, for example. As will be understood, the processing element 405 may be embodied in a number of different ways.

For example, the processing element 405 may be embodied as one or more complex programmable logic devices (CPLDs), microprocessors, multi-core processors, coprocessing entities, application-specific instruction-set processors (ASIPs), microcontrollers, and/or controllers. Further, the processing element 405 may be embodied as one or more other processing devices or circuitry. The term circuitry may refer to an entirely hardware embodiment or a combination of hardware and computer program products. Thus, the processing element 405 may be embodied as integrated circuits, application-specific integrated circuits (ASICs), field programmable gate arrays (FPGAs), programmable logic arrays (PLAs), hardware accelerators, other circuitry, and/or the like.

As will therefore be understood, the processing element 405 may be configured for a particular use or configured to execute instructions stored in volatile or non-volatile media or otherwise accessible to the processing element 405. As such, whether configured by hardware or computer program products, or by a combination thereof, the processing element 405 may be capable of performing steps or operations according to embodiments of the present disclosure when configured accordingly.

In one embodiment, the monitoring node computing entity 104 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 410, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the monitoring node computing entity 104 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 415, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 405. Thus, the databases, database instances, database management systems, data, applications, programs, program modules, scripts, source code, object code, byte code, compiled code, interpreted code, machine code, executable instructions, and/or the like may be used to control certain aspects of the operation of the monitoring node computing entity 104 with the assistance of the processing element 405 and operating system.

As indicated, in one embodiment, the monitoring node computing entity 104 may also include one or more communications interfaces 420 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the monitoring node computing entity 104 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the monitoring node computing entity 104 may include, or be in communication with, one or more input elements, such as a keyboard input, a mouse input, a touch screen/display input, motion input, movement input, audio input, pointing device input, joystick input, keypad input, and/or the like. The monitoring node computing entity 104 may also include, or be in communication with, one or more output elements (not shown), such as audio output, video output, screen/display output, motion output, movement output, and/or the like.

V. Exemplary System Operations

As described below, various embodiments of the present disclosure introduce techniques for efficient and scalable monitoring of a multi-node system by using a distributed ledger to describe candidate events associated with a monitored node and a hierarchical validation workflow to validate candidate events associated with ledger entry requests. Using a distributed ledger to describe candidate events associated with a monitored node provides a scalable and efficient way to store candidate event data associated with the monitored node. In some embodiments, one or more miner node computing entities and validator node computing entities can execute operations associated with a ledger entry requests to add a candidate event to a distributed ledger that is done in a distributed manner. This means that the distributed ledger system computing entity can maintain the distributed ledger without the need to request data from the monitored node computing entities and/or the one or more miner node computing entities and validator node computing entities, as in turn the miner node computing entities initiate ledger entries into distributed ledgers upon detecting candidate events associated with a monitored node that is associated with the multi-node system, and in turn, the one or more validator nodes can initiate a validation request to validate the candidate event.

In some embodiments, using a distributed ledger to maintain candidate events associated with a monitored node and using a hierarchical validation workflow that is based at least in part on a validator effect measure associated with the validator nodes lead to more efficient use of computational and network resources because it requires fewer number of network transmissions between the distributed ledger system computing entity and monitoring node computing entities (e.g., miner node computing entities and validator node computing entities). In some embodiments, without using the ledger-based techniques described herein, establishing occurrence of candidate events associated with the particular monitored node would require significant network transmissions in multiple request network transmissions and multiple response network transmissions, where each request network transmission is from a central computing entity to a respective monitored node computing entity to inquire about the occurrence and/or details of candidate events associated with the particular monitored node, and where each response network transmission is a response by a monitored node computing entity to a request network transmission that is received by the central computing entity and describes data regarding occurrence and/or details of candidate events associated with the particular monitored node. In contrast, using various ledger-based techniques described herein, eliminates the need for the noted request network transmissions and response network transmission to establish the occurrence of a candidate event of a particular monitored node and would require less network transmission, where each network transmission is a ledger entry request for a candidate event for a monitored node that is transmitted by a miner node computing entity to a central computing entity, such as the distributed ledger system computing entity or a validation request to validate the candidate event that is transmitted by a validator node computing entity to the central computing entity, such as the distributed ledger system computing entity. Which means that, by using the various ledger-based techniques described herein, the number of network transmissions needed to determine/maintain data about candidate events associated with a monitored node is decreased, which in turn means using the noted ledger-based techniques leads to more efficient computational/networking resources. Moreover, using the hierarchical validation workflow techniques described herein reduces computational complexity associated with performing effective monitoring using a set of operations that have less computational complexity.

FIG. 5 is an example flowchart diagram of an example process 500 for performing ledger-based monitoring of a multi-node system using a hierarchical validation workflow. Via the various steps/operations of the process 500, the distributed ledger system computing entity 106 can execute a hierarchical validation workflow to establish proof of occurrence of a candidate event associated with a monitored node.

The process 500 begins at step/operation 501 when the distributed ledger system computing entity 106 receives, from a miner node computing entity associated with a miner node, a ledger entry request for a candidate event, where the candidate event is associated with a monitored entity. The ledger entry request may comprise a request to commit the candidate event to a distributed ledger maintained by the distributed ledger system computing entity 106 (e.g., a request to add a data entry for the candidate event in associated distributed ledger). The candidate event may describe an event (e.g., activity, incident, interaction, and/or the like) having a designation, such as an event type designation that is within an event type space associated with the distributed ledger system computing entity 106. In some embodiments, a candidate event may be used to establish a proof of an object of interest for an associated monitored node. For example, where an event type space comprises a health-related event type as described above, each candidate event committed to a distributed ledger may be used to establish proof of health for the associated monitored node or otherwise represents proof of health for the associated monitored node. As another example, where an event type space comprises an E-commerce-related event type as described above each candidate event committed to a distributed ledger may be used to establish proof of transaction.

The distributed ledger system computing entity 106 may be associated with a distributed ledger system comprising at least one or more miner nodes and one or more validator nodes, where a miner node may describe a digital identifier associated with a computing entity representative of a real-world entity and/or a virtual entity that can initiate/propose entry of a candidate event associated with a monitored node to a corresponding distributed ledger. A miner node may be associated with one or more computing entities that may in turn be associated with a monitored node, and that may enable the miner node to collect data (such as event data) associated with the monitored node. An example of a miner node may include digital identifier associated with computing entity representative of a software provider. Another example of a miner node may include a digital identifier associated with computing entity representative of a provider of an electronic device such as a smart watch, a smart phone, Internet of Things device (IoT) device, and/or the like.

A monitored node may describe a digital identifier associated with a computing entity (e.g., monitored node computing entity 102) associated with a real-world entity or virtual entity whose candidate events may be monitored by one or more miner nodes and or validator nodes, and whose noted candidate events may be committed to a distributed ledger maintained by the distributed ledger system computing entity 106. In an operational example, each monitored node may comprise a digital identifier associated with a computing entity representative of a health insurance member of a health insurance provider (e.g., an individual enrolled in a health insurance plan that is offered by the health insurance provider), where for each digital identifier, each candidate event committed to a distributed ledger may represent proof of occurrence of a health event with respect to the health insurance member, and individually or collectively represent proof of health for the health insurance member. A monitored node may be monitored by one or more miner nodes and/or validator nodes. In some embodiments, a monitored node may be monitored by a miner node and/or validator node in that a miner node and/or validator node can collect data associated with certain events associated with the monitored node, where the certain events may include candidate events. A monitored node, for example, may be associated with one or more computing entities that may in turn be associated with a miner node and/or validator node, wherein the miner node and/or validator node (e.g., associated entity) can collect data associated with the monitored node based at least in part on the one or more computing entities associated with the monitored node and the miner node and/or validator node. The one or more computing entities, for example, may include a smart phone, a smart watch, a smart refrigerator, IoT device, a smart home device, a global positioning system (GPS) device and/or the like. A monitored node, for example, may be associated with one or more computing entities that may enable a miner node and/or validator node to collect data (e.g., miner event data describing a candidate event) associated with the monitored node via one or more software applications, software programs and/or the like associated with the one or more computing entities (e.g., installed on the one or more computing entities), where the one or more software applications, software programs and/or the like may be associated with the monitoring entity.

At step/operation 502, the distributed ledger system computing entity 106 identifies one or more of: (i) the miner node associated with the miner node computing entity, (ii) the monitored node associated with the ledger entry request, or (iii) the distributed ledger associated with the ledger entry request. In some embodiments, a ledger entry request may comprise one or more identifying fields for the miner node that is configured to uniquely identify the miner node. In some embodiments, the one or more identifying fields may include a digital identifier (e.g., representing the miner node). In some embodiments, identifying the miner node associated with the miner node computing entity may comprise identifying the digital identifier from the one or more identifying fields associated with the ledger entry request.

Additionally, and/or alternatively, in some embodiments, the ledger entry request may comprise one or more identifying fields for the monitored node that is configured to uniquely identify the monitored node. In some embodiments, the one or more identifying fields may include a digital identifier (e.g., representing the monitored node). In some embodiments, identifying the monitored node associated with the ledger entry request may comprise identifying the digital identifier from the one or more identifying fields associated with the ledger entry request. In some embodiments, the distributed ledger system computing entity 106 may identify the distributed ledger associated with a ledger entry request based at least in part on the one or more identifying fields for the monitored node.

At step/operation 503, the distributed ledger system computing entity 106 authenticates the ledger entry request. In some embodiments, the ledger entry request is authenticated based at least in part on permissions data associated with the miner node associated with the miner node computing entity. For example, a given monitored node may be associated with permissions data that describes access level for the miner node. A particular miner node, for example, may have the requisite permissions with respect to a first monitored node (e.g., to commit a candidate event for the first monitored node in associated distributed ledger) but may not have the requisite permission with respect to a second monitored node. In some embodiments authenticating the ledger entry request may comprise retrieving from a repository storing permissions data for miner nodes, permissions data for the miner node to determine if the miner node is associated with the requisite permissions to commit the candidate event associated with the ledger entry request to the corresponding distributed ledger.

In some embodiments, authenticating the ledger entry request may comprise verifying authentication data (e.g., a password, a passcode, a pin number, and/or the like) associated with the ledger entry request. In some embodiments, the ledger entry request may include authentication data that is configured to, if verified, demonstrate that the miner node associated with the ledger entry request possesses the requisite permission to access the corresponding distributed ledger for the monitored node associated with the ledger entry request or otherwise possesses the requisite permission to propose entry of the candidate event in the corresponding distributed ledger.

At step/operation 504, the distributed ledger system computing entity 106 identifies a consensus threshold for the ledger entry request. In some embodiments, the consensus threshold for the ledger entry request may be identified based at least in part on the event type associated with the candidate event. The candidate event may be associated with an event type of a plurality of event types. As described above, a candidate event may be associated with an event type that is within an event type space associated with the distributed ledger system computing entity 106, where an event type space may comprise a plurality of event types that indicate events that may be committed to a distributed ledger maintained by the distributed ledger system computing entity 106. In some embodiments, an event type space may be associated with a category of events. For example, a distributed ledger system may be associated with an event type space, where each event type within the event type space comprises a health-related event type (e.g., physical activity event type, medical visit event type, laboratory visit event type, and/or the like). As another example, a distributed ledger system may be associated with an event type space, where each event type within the event type space comprises an E-commerce-related event type (e.g., a purchase event type, a supply event type, a delivery event type, and/or the like).

In some embodiments, each event type of the plurality of event types is associated with a consensus threshold. In some embodiments, a given event type may be associated with a consensus threshold that is different from a consensus threshold for one or more other event types. In some embodiments, to identify the consensus threshold for the ledger entry request, the distributed ledger system computing entity 106: (i) identifies the event type associated with the ledger entry request based at least in part on the candidate event associated with the ledger entry request, and (ii) identifies the consensus threshold for the candidate event based at least in part on the identified event type.

In some embodiments, the distributed ledger system computing entity 106 may identify the event type for the candidate event associated with the ledger entry request based at least in part on an event classification machine learning model. The event classification machine learning model, for example, may be a trained machine learning model that is configured to generate an event type classification for a candidate event based at least in part on miner event data associated with the candidate event. In some embodiments, the event classification machine learning model may be a natural language-based machine learning model. A miner event data may describe monitoring data for the candidate event proposed by a miner node for entry into a distributed ledger. Miner event data, for example, may comprise data collected by the miner node during a candidate event associated with the monitored node, where the data may describe attributes of the candidate event. An example of a miner event data may include data collected during a physical activity event, where the data describes attributes of the physical activity event. For example, miner event data for a marathon event associated with a monitored node associated with a computing entity representative of an individual may comprise attributes of the marathon event that may include distance covered by the individual, the location of the marathon event, date and/or time of the marathon event, and/or the like.

FIG. 6 depicts an operational example of event types associated with a proof of health event type space. As depicted in FIG. 6, each event type 601 is associated with a consensus threshold 602 in a possible consensus threshold range of [0 1]. As depicted in FIG. 6, each event type 601 may be associated with a different consensus threshold 602. FIG. 6 further depicts example steps 603 associated with exemplary event types 601.

Returning to FIG. 5 at step/operation 505, the distributed ledger system computing entity 106 generates a validation score (e.g., initializes a validation score) for the candidate event. The validation score may comprise a baseline score (e.g., initial validation score) for the candidate event. In some embodiments, the baseline score may be generated based at least in part on a miner effect measure associated with the miner node (e.g., miner node associated with the miner node computing entity that transmitted the ledger entry request). A miner effect measure may describe an estimated measure, such as a score, assigned to a miner node, that may be used by the distributed ledger system computing entity 106 to initialize a validation score for a candidate event, which in turn may be used to determine if a candidate event should be committed to a distributed ledger.

In some embodiments, a miner effect measure for a given miner node may be reflective of an estimated mining efficacy of the miner node. Additionally, and/or alternatively, in some embodiments, a miner effect measure for a given monitored node may be indicative of a confidence level and/or a trust level associated with the miner node with respect to ledger entry requests (e.g., ratio of ledger entry requests resulting in candidate event entries in the corresponding distributed ledger). In some embodiments, the miner effect measure for a given miner node may be determined based at least on miner effect measure criteria. In some embodiments, examples of miner effect measure criteria may include a data collection size measure (e.g., that describes the amount of data currently maintained by a miner node), geospatial prevalence measure (e.g., that describes a population percentage with respect to which a miner node has data collection access), association with public API, past miner performance (e.g., a ratio of number of times candidate events proposed by a miner node were committed into a distributed ledger by validator nodes of the distributed ledger system), past ratings for the miner node, and/or the like. In some embodiments, the miner effect measure may be adjusted (e.g., increased or decreased) based at least in part on one or more of the noted miner effect measure criteria. In some embodiments, the miner effect measure for a miner node may be determined using a machine learning model based at least in part on one or more features/variables associated with the miner node, which for example, may include the noted miner effect measure criteria for the miner node.

In some embodiments, a miner node may be associated with a miner effect measure for each event type of a plurality of event types. For example, in some embodiments, the baseline score may be generated based at least in part on a miner effect measure associated with the miner node for the event type of the candidate event. For example, in some embodiments, generating a baseline score may comprise identifying, for the miner node, the miner effect measure associated with the miner node for the particular event type for the candidate event, and generating the baseline score to comprise the miner effect measure associated with the miner node for the identified event type (e.g., initializing a validation score for the candidate event based at least in part on the miner effect measure associated with the miner node for the event type of the candidate event). It should be understood, however, that in some embodiments, the miner effect measure for a given miner node may be the same for each event type of the plurality of event types. Furthermore, it should be understood that in some embodiments, the baseline score may be generated based at least in part on other criteria/measures, that may not include applying (e.g., may not comprise) the miner effect measure associated with the miner node. In some embodiments, where a given node may represent a miner node and a validator node, a miner effect measure for the miner node may comprise a validator effect measure for the miner node.

A validator effect measure may describe an estimated measure (such as a score) assigned to a validator node, that can be applied to a validation score for a candidate that is indicative of validation (e.g., confirmation, endorsement, and/or the like) of the occurrence of the candidate event. In some embodiments, a validator effect measure for a given validator node may be reflective of an estimated validation efficacy of the validator node. Additionally, and/or alternatively, in some embodiments, a validator effect measure for a given monitored node may be indicative of a confidence level and/or a trust level associated with the validator node with respect to validating (e.g., endorsing candidate events). In some embodiments, the validation effect measure for a given validator node may be determined based at least on validator effect measure criteria. In some embodiments, examples of validator effect measure criteria may include a data collection size measure (e.g., that describes the amount of data currently maintained by a validator node), geospatial prevalence measure (e.g., that describes a population percentage with respect to which a validator node has data collection access), association with public API, past validation performance, past ratings for the validator node, and/or the like.

FIG. 7 depicts an operational example of validator effect measure criteria 701 and corresponding effect on validator effect measure 702 for a given validator node. As shown in FIG. 7, each validator effect measure criteria 701 may contribute to the validator effect measure 702 for a given validator node (e.g., effect on a validation score). In some embodiments, the validator effect measure may be adjusted (e.g., increased or decreased) based at least in part on one or more of the noted validator effect measure criteria. In some embodiments, the validator effect measure for a validator node may be determined using a machine learning model based at least in part on one or more features/variables associated with the validator node, which for example, may include the noted validator effect measure criteria for the validator node.

Returning to FIG. 5 at step/operation 506, the distributed ledger system computing entity 106 causes the ledger entry request to be accessible to one or more validator node computing entities. In some embodiments, causing the ledger entry request to be accessible comprises adding the candidate event to a first validation queue (e.g., a primary validation queue). In some embodiments, adding the candidate event to a first validation queue (e.g., primary validation queue) may comprise transmitting the miner event data to the first validation queue (e.g., primary validation queue). As described above, the miner event data may comprise data reported by the miner node computing entity as representing the candidate event proposed by the miner node computing entity for entry into a distributed ledger associated with the corresponding monitored node.

In some embodiments, a primary validation queue may describe a pipeline that is configured to temporarily maintain candidate events (e.g., miner event data) associated with ledger entry requests that have been authenticated but not associated with a validation iteration (e.g., yet to be validated or attempted to be validated by a validator node). In some embodiments, the primary validation queue may be accessible to, based at least in part on the event type associated with the candidate event, one or more validator node computing entities associated with one or more validator nodes. In some embodiments, a validator node may be associated with the requisite permissions to access data associated with candidate events having certain event types and may not be associated with the requisite permissions to access data associated with candidate events having certain other event types. As an operational example, consider a first validator node that is associated with a smart watch and a second validator node that is associated with a doctor visit record, the first validator node may be granted the requisite permissions to access data associated with physical activity events, whereby the validator node may validate (or attempt to validate) physical activity events, but may not be granted the requisite permissions to access data associated with doctor office visit event. In some embodiments, causing the ledger entry request to be accessible to the one or more validator node computing entities may comprise transmitting a ledger entry request notification to one or more validator node computing entities.

At step/operation 507, the distributed ledger system computing entity 106 generates a ledger entry determination for the candidate event. A ledger entry determination may describe a result of a ledger entry request that is determined based at least in part on a validation score for the candidate event proposed via the ledger entry request, to be committed into a distributed ledger. In some embodiments, an affirmative ledger entry determination may describe a ledger entry request associated with a validation score that satisfies the consensus threshold for the candidate event, and a non-affirmative ledger entry determination may describe a ledger entry request associated with a validation score that fails to satisfy the consensus threshold for the candidate event. In some embodiments, in response to an affirmative ledger entry determination, the distributed ledger system computing entity 106 initiates execution of a write command to add the candidate event to the distributed ledger associated with the monitored node associated with the candidate event.

In some embodiments generating the ledger entry determination comprises executing a hierarchical validation workflow. In some embodiments, the hierarchical validation workflow comprises an ordered sequence of L validation iterations, where (i) each validation iteration is associated with a corresponding validation score based at least in part on output of the validation iteration, and (ii) each of one or more ith non-initial validation iterations is performed based at least in part on association of an (i−1)th validation iteration with a non-affirmative validation determination. In some embodiments, a given hierarchical validation workflow comprises an ordered sequence of L validation iterations that is less than and/or equal to a maximum number of validation iterations (M).

For example, consider where M=5 and a first validation iteration is associated with a non-affirmative validation iteration, a second validation iteration may be performed based at least in part on association of the first validation iteration with a non-affirmative validation determination output for the first validation iteration, a third validation iteration may be performed based at least in part on association of the second validation iteration with a non-affirmative validation determination output for the second validation iteration, a forth validation iteration may be performed based at least in part on association of the third validation iteration with a non-affirmative validation determination output for the third validation iteration, and a fifth validation iteration may not be performed based at least in part on association of the fourth validation iteration with an affirmative validation determination output for the fourth validation iteration. Accordingly, in the noted example, L=4 and is less than the maximum number of validation iterations (M). Moreover, each of the first, second third and fourth validation iterations are non-final validation iterations for the particular executed hierarchical validation workflow.

As another example, consider where M=3, and a first validation iteration is associated with a non-affirmative validation iteration, a second validation iteration may be performed based at least in part on association of the first validation iteration with a non-affirmative validation determination output for the first validation iteration, a third validation iteration may be performed based at least in part on association of the second validation iteration with a non-affirmative validation determination output for the second validation iteration, and a fourth validation iteration may not be performed based at least in part on association of the third validation iteration with a final validation iteration. In the noted example, L=3 and is equal to the maximum number of validation iterations (M). Moreover, in the noted example, the first and second validation iterations are non-final validation iterations, and the third validation iteration is the final validation iteration for the particular executed hierarchical validation workflow. In some embodiments, the maximum number of validation iterations (M) that may be performed for a given ledger entry request may be configurable. For example, M may be selected to be 5, 10, 20, 32, 40 and/or the like.

A validation iteration may describe a computer executed operation that may be performed, in response to a ledger entry request. A validation iteration may be associated with a particular validator node and may comprise applying a validator effect measure for the validator node to the validator score for the candidate event based at least in part on comparing miner event data with validator event data. A validator event data may describe monitoring data that describes attributes of a candidate event that is used by a validator node to validate or attempt to validate a candidate event. For example, a validator event data may comprise data (e.g., monitoring data) that is deemed by a validator node as reflective of the candidate event. Validator event data, for example, may comprise data collected by the validator node during a candidate event associated with the monitored node, where the data may describe attributes of the candidate event. An example of a validator event data may include data collected during a physical activity event, where the data describes attributes of the physical activity event. For example, validator event data for a marathon event associated with a monitored node associated with a computing entity representative of an individual may comprise attributes of the marathon event that may include distance covered by the individual, the location of the marathon event, date and/or time of the marathon event, and/or the like. In some embodiments, where one or more nodes may comprise a miner node, as well as a validator node, for a given ledger entry request, each validation iteration can be associated with a validator node that is not the miner node associated with the miner node computing entity that transmitted the ledger entry request.

In some embodiments, for each non-final validation iteration of a hierarchical validation workflow associated with a non-affirmative validation determination, the distributed ledger system computing entity 106 may be configured to make the ledger entry request accessible to one or more validator node computing entities based at least in part on adding the candidate event to one or more validation queues (e.g., transmitting the miner event data to a second validation queue, a third validation, a fourth validation queue, and/or the like). For example, in some embodiments, in response to an initial validation iteration that is associated with a non-affirmative validation determination, data (e.g., miner event data) associated with the candidate event is added to a second validation queue (e.g., a secondary validation queue). In some embodiments, in response to a non-initial validation iteration that is associated with a non-affirmative validation determination, data (e.g., miner event data) associated with the candidate event is added to another validation queue (e.g., a third validation queue, a fourth validation queue, and/or the like) that is a secondary validation queue. A secondary validation queue may describe a pipeline that is configured to temporarily maintain candidate events (e.g., miner event data) associated with at least one validation iteration but having a validation score that fails to satisfy the corresponding consensus threshold for the respective candidate event (e.g., candidate events that are yet to achieve a qualifying validation score after at least one validation iteration, where a qualifying validation score describes a validation score that satisfies the corresponding validation threshold for the candidate event). In some embodiments, data (e.g., miner event data) associated with the candidate event is added to different validation queues for each validation iteration that is associated with a non-affirmative validation determination. In some embodiments, data (e.g., miner event data) associated with the candidate event is added to the same validation queue for each validation iteration that is associated with a non-affirmative validation determination.

In some embodiments, multiple validation iterations (e.g., L>1) may be performed, where each validation iteration is associated with a different validator node computing entity, and for each validation iteration, the distributed ledger system computing entity 106 incrementally updates the validation score associated with the immediately preceding validation iteration in response to matching score satisfying the matching score threshold until: (i) a maximum number of iterations (M) has been performed (e.g., L=M) or (ii) a validation iteration is associated with an affirmative validation determination (e.g., validation score that satisfies the consensus threshold for the candidate event).

In some embodiments, a ledger entry request may be associated with an affirmative ledger entry determination based at least in part on a validation iteration that is associated with an affirmative validation determination. In some embodiments, a ledger entry request may be associated with a non-affirmative ledger entry determination based at least in part on a validation iteration that is associated with a non-affirmative validation determination.

In some embodiments, the step/operation 507 may be performed in accordance with the example process 800 that is depicted in FIG. 8, which is an example process for executing a validation iteration.

The process 800 begins at step/operation 801 when the distributed ledger system computing entity 106 receives a validation request from a validator node computing entity. A validation request may describe a request by a validator node computing entity associated with a validator node, where the request may comprise a request to validate (e.g., endorse) a candidate event associated with a ledger entry request. In some embodiments, the validation request may comprise retrieving, by the validator node computing entity, a miner event data from a first validation queue (e.g., a primary validation queue).

At step/operation 802, the distributed ledger system computing entity 106 identifies a matching score that is generated based at least in part on miner event data for the candidate event and validator event data for the candidate event. In some embodiments the matching score is generated based at least in part on comparing the miner event data to the validator event data (e.g., comparing attributes of the candidate event according to the collected/recorded data of the validator node for the candidate event with attributes of the candidate event according to the collected/recorded data of the miner node for the candidate event).

At step operation 803, the distributed ledger system computing entity 106 determines whether the matching score satisfies a matching score threshold.

At step/operation 803a, the distributed ledger system computing entity 106, in response to a matching score that satisfies the matching score threshold, incrementally updates the validation score based at least in part on the validator effect measure for the validator node associated with the validator node computing entity. In some embodiments, incrementally updating a validation score comprises applying a validator effect measure associated with the validator node for the event type to the validation score (e.g., validation score associated with the immediately preceding validation iteration) to generate the updated validation score. In some embodiments, applying a validator effect measure to a validation score for a candidate event comprise increasing the validation score for the candidate event based at least in part on the validator effect measure, where the validator effect measure, for example, may comprise a numerical value/score.

At step/operation 803b, the distributed ledger system computing entity 106, in response to a matching score that fails to satisfy the matching score threshold, causes the ledger entry request to be accessible to one or more validator node computing entities based at least in part on association of the validation iteration with a non-final validation iteration. In some embodiments, causing the ledger entry request to be accessible comprises adding the candidate event to a secondary validation queue (e.g., transmitting the miner event data to a secondary validation queue). In some embodiments, in response to determining that the validation iteration is a final validation iteration (e.g., maximum number of iterations (M) has been performed), the distributed ledger system computing entity 106 may store the miner event data representative of the candidate event data in a repository (e.g., external repository) associated with the distributed ledger system computing entity 106.

At step/operation 804, the distributed ledger system computing entity 106, determines whether the updated validation score satisfies a consensus threshold for the event type associated with the candidate event.

At step/operation 804a, the distributed ledger system computing entity 106, in response to the updated validation score satisfying the consensus threshold for the event type associated with the candidate event, generates an affirmative validation determination, and (ii) initiates execution of a commit command, write command, and/or similar words used herein interchangeably to add the candidate event to the distributed ledger.

At step/operation 804b, the distributed ledger system computing entity 106, in response to the updated validation score failing to satisfy the consensus threshold for the event type associated with the candidate event: (i) generates a non-affirmative validation determination, and (ii) causes the ledger entry request to be accessible to one or more validator node computing entities based at least in part on association with a non-final validation iteration, where the one or more validator node computing entities may attempt to validate the candidate event associated with the ledger request. In some embodiments, causing the ledger entry request to be accessible comprises adding the candidate event to a secondary validation queue (e.g., transmitting the miner event data to a secondary validation queue).

In some embodiments, in response to determining that the validation iteration is a final validation iteration (e.g., maximum number of iterations (M) has been performed), the distributed ledger system computing entity 106 may store the miner event data representative of the candidate event data in a repository (e.g., external repository) associated with the distributed ledger system computing entity 106.

In some embodiments, multiple validation iterations may be performed, repeating steps 801-804 with each validation iteration associated with a different validator node computing entity and incrementally updating the validation score associated with the immediately preceding validation iteration in response to matching score satisfying the matching score threshold until: (i) a maximum number of iterations (M) has been performed or (ii) a validation iteration is associated with an affirmative validation determination.

In some embodiments, in response to determining that the validation iteration is a final validation iteration and determining that the candidate event is associated with (or otherwise comprise) data that is deemed critical, the distributed ledger system computing entity 106 may cause the ledger entry request to be accessible to one or more validator node computing entities. In some embodiments, causing the ledger entry request to be accessible to one or more validator node computing entities may comprise adding the candidate event to a tertiary validation queue (e.g., transmitting the miner event data to a tertiary validation queue), where one or more validator nodes may attempt to validate the candidate event. A tertiary validation queue may describe a pipeline that is configured to temporarily maintain candidate events (e.g., miner event data) having a validation score that fails to satisfy corresponding consensus threshold after execution of a hierarchical validation workflow for a candidate event that is deemed to be associated with critical data.

In some embodiments, for an executed hierarchical validation workflow whose final validation iteration is associated with a non-affirmative validation determination, the distributed ledger system computing entity 106 may decrease the miner effect measure associated with the miner node and decrease the validator effect measure for each validator node associated with a non-affirmative validation determination. As noted above, in some embodiments, miner effect measure may be the same as validator effect measure.

In some embodiments, upon determining that a ledger entry request is not associated with a validation iteration (e.g., where no validation requests is transmitted to the distributed ledger system computing entity 106), the distributed ledger system computing entity 106, may be configured to decrease the validator effect measure (e.g., for the particular event type) for the miner node.

In some embodiments, as a non-limiting example, a validator effect measure may be decreased based at least in part on:

$$V_{new} = V_{orig} * e^{-1/n+1}, \qquad \text{Equation 1}$$

where:
$V_{new}$ is the decreased validator effect measure;
$V_{orig}$ is the original (e.g., current) validator effect measure; and
n is the number of validator nodes associated with the hierarchical validation workflow.

As noted above, in some embodiments, a miner effect measure for a given miner node may be the same as the validator effect measure for the given miner node. Accordingly, in some embodiments, miner effect measure may be decreased based at least in part on equation 1 above.

In some embodiments, for each ledger entry request where the corresponding candidate event is committed to a distributed ledger, the distributed ledger system computing entity 106 may be configured to increase the miner effect measure for: (i) the miner node, and (ii) each validator node associated with a validation iteration with an affirmative validation determination output.

Additionally, and/or alternatively, in some embodiments, for each ledger entry request where the corresponding candidate event is committed to a distributed ledger, the distributed ledger system computing entity 106 may be configured to apply a reward to: (i) the miner node, and (ii) each validator node associated with a validation iteration with an affirmative validation determination. In some embodiments, the reward may comprise a fraction of a coin/value. Additionally, and/or alternatively, in some embodiments, the reward may comprise an increase in a trust measure (e.g., indicative of a trust level) associated with the corresponding miner node and validator nodes. For example, in some embodiments, each miner node and validator node may be associated with a trust measure, where for each ledger entry request where the corresponding candidate event is committed to a distributed ledger, the distributed ledger system computing entity 106 may be configured to increase the trust measure associated with: (i) the miner node, and (ii) each validator node associated with a validation iteration with an affirmative validation determination output.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
receiving, by one or more processors, a ledger entry request originating from a miner node computing entity associated with a miner node of a plurality of nodes, wherein (a) the ledger entry request is a request to commit a candidate event to a distributed ledger, and (b) the candidate event is associated with an event type of a plurality of event types;

generating, by the one or more processors, a validation score wherein (a) the validation score comprises a baseline score, and (b) the baseline score is generated based at least in part on a miner effect measure associated with the miner node for the event type; and executing, by the one or more processors, a hierarchical validation workflow, wherein: (i) the hierarchical validation workflow comprises an ordered sequence of L validation iterations, (ii) each of one or more ith non-initial validation iterations is performed based at least in part on an association of an (i−1)th validation iteration with a non-affirmative validation determination, and (iii) each validation iteration comprises:

receiving, originating from a validator node computing entity associated with a validator node of the plurality of nodes, a validation request to validate the candidate event, incrementally updating the validation score based at least in part on monitoring data associated with the validation request that matches attributes of the candidate event, and in response to the updated validation score satisfying a consensus threshold for the candidate event, (i) generating an affirmative validation determination, and (ii) initiating execution of a write command to add the candidate event to the distributed ledger.

2. The computer-implemented method of claim 1, wherein each validation iteration is associated with a unique validator node of the plurality of nodes.

3. The computer-implemented method of claim 1, wherein the candidate event is added to a primary validation queue in response to receiving the ledger entry request.

4. The computer-implemented method of claim 1, wherein the candidate event is added to a secondary validation queue in response to an initial validation iteration that is associated with a non-affirmative validation determination.

5. The computer-implemented method of claim 1, wherein incrementally updating the validation score comprises applying a validator effect measure associated with the validator node for the event type to the validation score to generate the updated validation score.

6. The computer-implemented method of claim 1, wherein the distributed ledger is associated with a monitored node of a plurality of monitored nodes.

7. The computer-implemented method of claim 1, wherein: (i) the consensus threshold for the candidate event is determined based at least in part on the event type associated with the candidate event.

8. The computer-implemented method of claim 1, wherein the plurality of nodes comprises at least one node comprising a miner node and a validator node.

9. A system comprising memory and one or more processors communicatively coupled to the memory, the one or more processors configured to:

receive a ledger entry request originating from a miner node computing entity associated with a miner node of a plurality of nodes, wherein (a) the ledger entry request is a request to commit a candidate event to a distributed ledger, and (b) the candidate event is associated with an event type of a plurality of event types;

generate a validation score, wherein (a) the validation score comprises a baseline score, and (b) the baseline score is generated based at least in part on a miner effect measure associated with the miner node for the event type; and execute a hierarchical validation workflow, wherein: (i) the hierarchical validation workflow comprises an ordered sequence of L validation iterations, (ii) each of one or more ith non-initial validation iterations is performed based at least in part on an association of an (i−1)th validation iteration with a non-affirmative validation determination, and (iii) each validation iteration comprises:

receiving, originating from a validator node computing entity associated with a validator node of the plurality of nodes, a validation request to validate the candidate event, incrementally updating the validation score based at least in part on monitoring data associated with the validation request that matches attributes of the candidate event, and in response to the updated validation score satisfying a consensus threshold for the candidate event, (i) generating an affirmative validation determination, and (ii) initiating execution of a write command to add the candidate event to the distributed ledger.

10. The system of claim 9, wherein each validation iteration is associated with a unique validator node of the plurality of nodes.

11. The system of claim 9, wherein the candidate event is added to a primary validation queue in response to receiving the ledger entry request.

12. The system of claim 9, wherein the candidate event is added to a secondary validation queue in response to an initial validation iteration that is associated with a non-affirmative validation determination.

13. The system of claim 9, wherein incrementally updating the validation score comprises applying a validator effect measure associated with the validator node for the event type to the validation score to generate the updated validation score.

14. The system of claim 9, wherein the distributed ledger is associated with a monitored node of a plurality of monitored nodes.

15. The system of claim 9, wherein: (i) the consensus threshold for the candidate event is determined based at least in part on the event type associated with the candidate event.

16. The system of claim 9, wherein the plurality of nodes comprises at least one node comprising a miner node and a validator node.

17. One or more non-transitory computer-readable storage media including instructioins that, when executed by one or more processors, cause the one or more processors to:

receive a ledger entry request originating from a miner node computing entity associated with a miner node of a plurality of nodes, wherein (a) the ledger entry request is a request to commit a candidate event to a distributed ledger, and (b) the candidate event is associated with an event type of a plurality of event types;

generate a validation score, wherein (a) the validation score comprises a baseline score, and (b) the baseline score is generated based at least in part on a miner effect measure associated with the miner node for the event type; and execute a hierarchical validation workflow, wherein: (i) the hierarchical validation workflow comprises an ordered sequence of L validation iterations, (ii) each of one or more ith non-initial validation iterations is performed based at least in part on an association of an (i−1)th validation iteration with a non-affirmative validation determination, and (iii) each validation iteration comprises:

receiving, originating from a validator node computing entity associated with a validator node of the plurality of nodes, a validation request to validate the candidate event, incrementally updating the validation score based at least in part on monitoring data associated with the validation request that matches attributes of the candidate event, and in response to the updated validation score satisfying a consensus threshold for the candidate event, (i) generating an affirmative validation determination, and (ii) initiating execution of a write command to add the candidate event to the distributed ledger.

18. The one or more non-transitory computer-readable storage media of claim 17, wherein each validation iteration is associated with a unique validator node of the plurality of nodes.

19. The one or more non-transitory computer-readable storage media of claim 17, wherein the candidate event is added to a primary validation queue in response to receiving the ledger entry request.

20. The one or more non-transitory computer-readable storage media of claim 17, wherein the candidate event is added to a secondary validation queue in response to an initial validation iteration that is associated with a non-affirmative validation determination.

* * * * *